Figure 1:
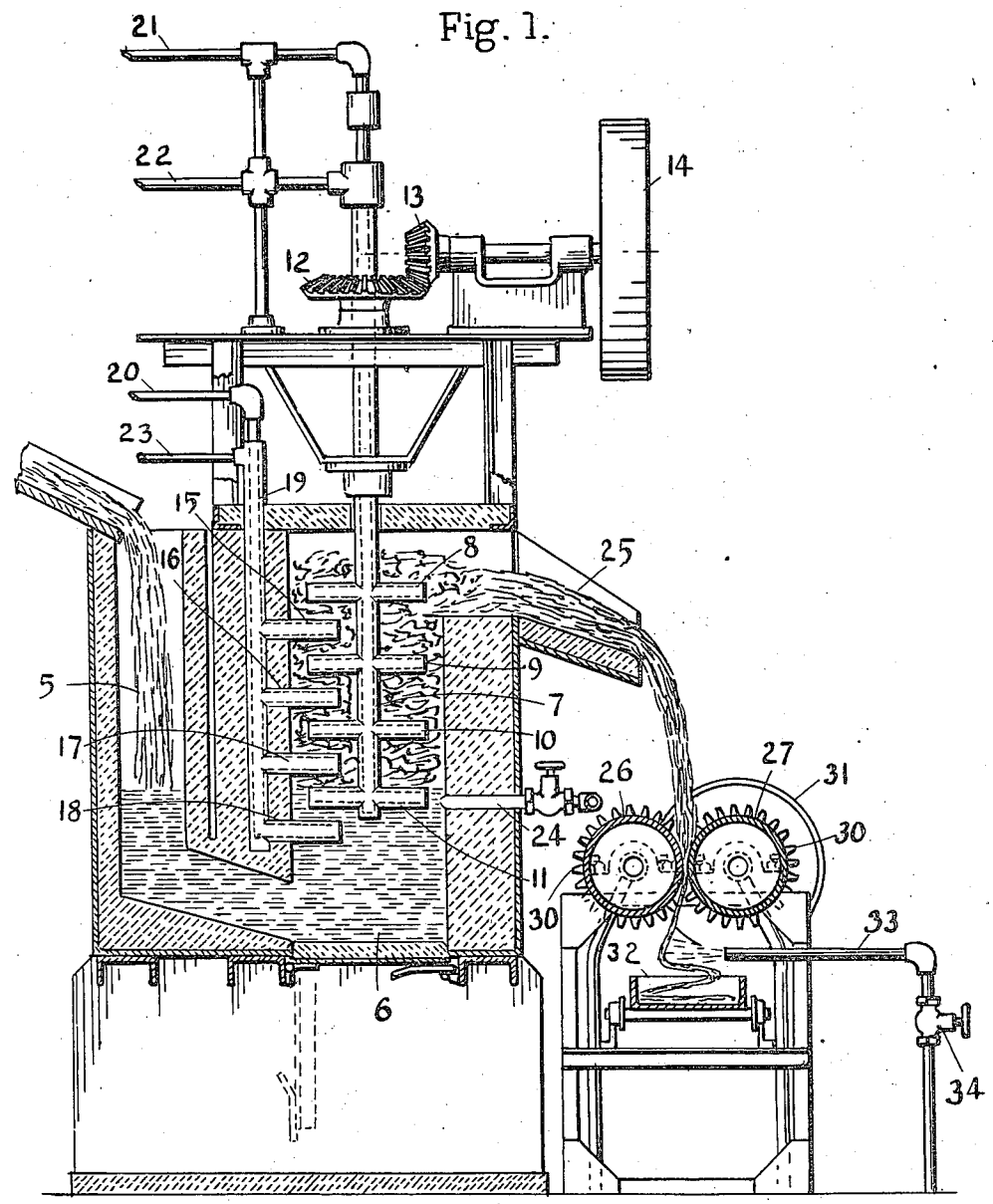

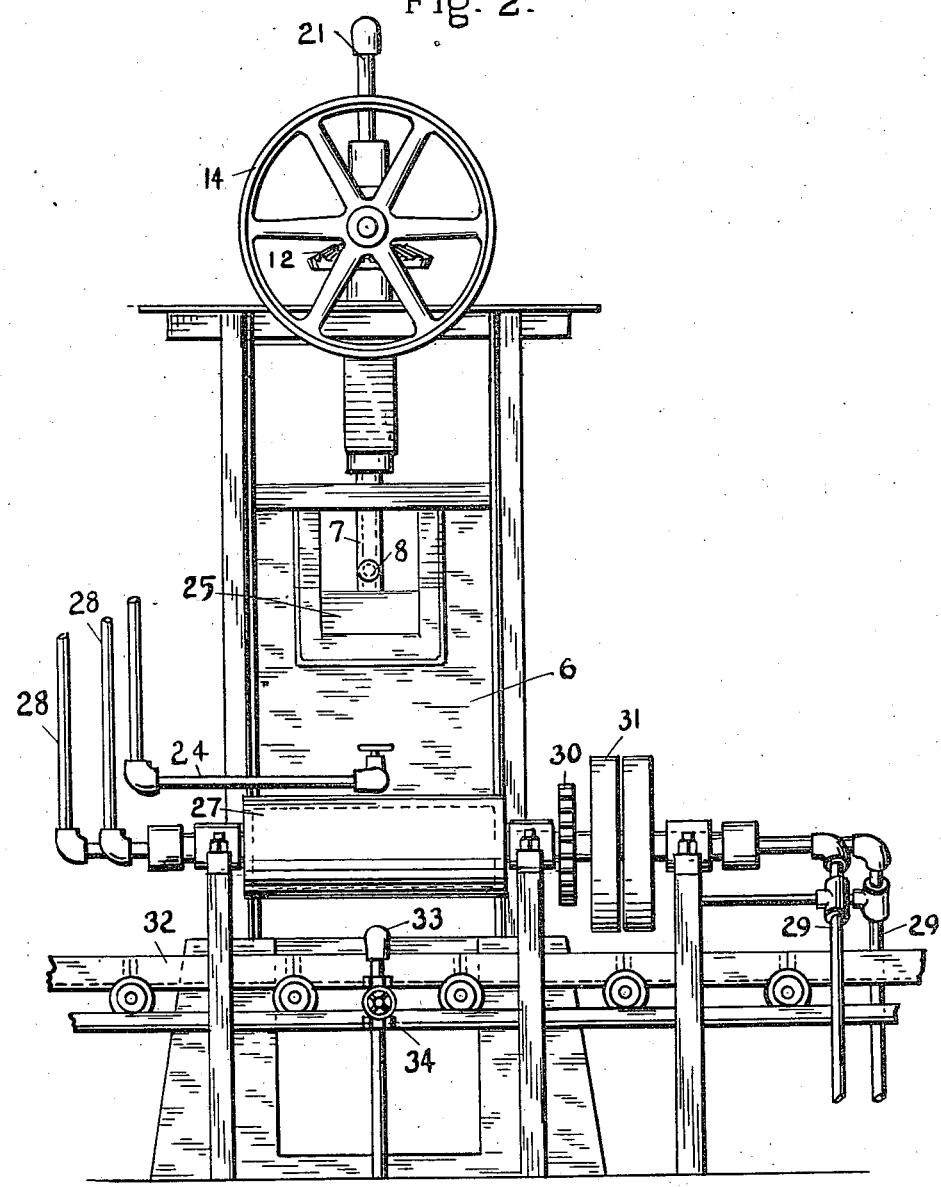

Patented June 12, 1923.

1,458,858

UNITED STATES PATENT OFFICE.

MATHIAS OVROM SEM, OF CHRISTIANIA, NORWAY, ASSIGNOR TO DET NORSKE AKTIESELSKAB FOR ELEKTROKEMISK INDUSTRI, NORSK INDUSTRI-HYPOTEK-BANK, OF CHRISTIANIA, NORWAY.

PROCESS OF PRODUCING HOMOGENEOUS POROUS MATERIALS.

Application filed May 15, 1920. Serial No. 381,717.

*To all whom it may concern:*

Be it known that I, MATHIAS OVROM SEM, a subject of the King of Norway, and a resident of Christiania, Kingdom of Norway, have invented certain new and useful Improvements in the Processes of Producing Homogeneous Porous Materials, of which the following is a specification.

This invention relates to porous materials and more particularly to that type of porous materials which is used as or in the manufacture of building materials and for insulating purposes.

The object of the invention is a process whereby porous melts may be treated in order to obtain a final product of high porosity.

By a suitable treatment of slags or other melts it is possible to produce a foam which may be cast in moulds. Upon cooling solid porous pieces of the desired form will then be obtained. I have described such a process in my prior United States patent application, Serial No. 345,445.

I have found that the foaming operation may be carried out with the greatest facility, when the foam produced has a high fluidity. The removal of the foam from the foaming apparatus will then cause no trouble, and the whole foaming operation will run smoothly. On casting or moulding such fluid porous material difficulties arise which are not noticeable if the material has a comparatively low fluidity.

I have thus found that if a very fluid foam is cooled in moulds in the usual manner, the exterior parts of the finished product possess a homogeneous structure, while the interior parts are filled with comparatively large bubbles or cavities. The reason for this must be that a comparatively rapid cooling takes place in the exterior parts of the mass, while the interior for a comparatively long time remains at a high temperature. Therefore the bubbles in the interior of the mass to some extent burst and form large bubbles, which have a tendency to rise and enlarge by absorbing smaller bubbles.

From this observation I have arrived at the conclusion that if the whole mass be rapidly and thoroughly cooled before being cast, it would uniformly retain its homogeneous structure, even if the final cooling is carried out very slowly.

My experiments have shown that the bubbles of every foam of the type here concerned, at a certain interval of temperature have no tendency to burst, while at the same time the foam possesses sufficient plasticity to be easily moulded. By utilizing these hitherto unknown qualities of the foam at certain temperatures I have succeeded in producing homogeneous porous bodies of any desired form when employing highly fluid foam. As mentioned above such foam may easily be removed from the foaming apparatus, running therefrom more regularly than foam of lower fluidity, and according to the present invention I avoid all difficulties connected with the casting and moulding of the highly fluid foam.

My method broadly consists in subjecting the foam or porous melt to be treated to the action of one or more cooling bodies, which press the mass to a comparatively thin sheet, thus cooling the whole mass. In this manner a rapid and thorough cooling is effected. The temperature of the cooling bodies is regulated so as to give the foam a sufficient plasticity for casting or moulding after having passed the cooling bodies.

I may increase the effect of the cooling by directing water or cold gases on the porous mass after it has passed the cooling bodies.

It is of course impossible to give a definite temperature as the most suitable for moulding the cooled foam or porous melt, as this temperature will vary according to the composition of the material in question.

After the foam has passed the cooling bodies and has been rolled or moulded to the desired shape, I let the final cooling take place comparatively slowly to avoid formation of tensions in the resulting porous material.

The product obtained is very well adapted for use as a building or insulating material and its porosity and solidity may be varied as desired within wide limits. Further my product may with advantage be used as a substitute for previously known products from slags such as granulated slag, slag wool and others.

In the following specific illustration I give an example of the preferred way of carrying out my method, reference being made to the accompanying drawings forming part of this application.

Fig. 1 is a sectional view of the apparatus preferably used in order to carry out my invention, and Fig. 2 is a side view thereof. In the specific example chosen for illustration I make use of a slag having the following approximate analysis:

| | |
|---|---|
| $SiO_2$ | 50% |
| $Al_2O_3$ | 15% |
| $CaO$ | 30% |
| $MgO$ | 5% |

I melt this slag by heating it in any commonly known suitable type of electric furnace to approximately 1400° C. I continuously lead this molten slag through a channel 5 into a container 6, which is made of refractory material capable of withstanding the slag. The container is provided with a stirrer, which consists of a double tube 7 having cross-pieces 8, 9, 10 and 11 also consisting of double tubes. The cross-pieces of the stirrer when rotated by means of bevelled gears 12 and 13 and pulley 14 will pass between similar double tube cross-pieces 15, 16, 17 and 18, mounted on a double tube 19 in the wall of the container 6. All of the double tubes are water cooled. The water may conveniently be introduced respectively, through pipes 20 and 21, and leave the system respectively through tubes 22 and 23. The double tubes allow the water to enter through the inner tube and return through the outer tube, thus cooling the stirring apparatus. I introduce water into the container through a pipe 24 at the same time as the stirrer is rotated. This water will immediately evaporate when touching the hot slag, and a foam will be formed which will rise to the top of the container 6, and continuously pass out through an overflow 25. I regulate the amount of water introduced through the pipe 24, so as to give the foam a temperature of approximately 1000° C. From the overflow 25 the foam cascades between two rollers 26 and 27. These are made of iron and are water cooled, the water entering respectively through pipes 28, 28, and leaving through pipes 29, 29 respectively. The rollers are provided with gears 30, and are driven by means of a pulley 31. The opening between the two rollers is adjustable and preferably kept about five millimeters wide. The slag or foam will leave the rollers in the form of a sheet having this thickness. I regulate the temperature of the rollers so as to cool the mass to about 800° C. Additional cooling means may, if desired, be provided and are indicated in the form of a fluid spray such as water supplied through the pipe line 33 and regulated by means of a valve 34. The thin sheet formed between the rollers will drop into moulds 32, passing slowly under the rollers on a conveyor. The moulds will thus be filled with porous material, which will solidify when it has been cooled down to about 700° C. I have found that in my foam there is no tendency to form large bubbles in the interior, when the whole mass has been cooled to about 800° C. as effected by the rollers 26 and 27. The solid pieces of porous material in the moulds are removed from the conveyor and transferred to a cooling chamber where a slow cooling to ordinary temperature is effected. The material will then have a specific gravity of approximately 0.5. I may however vary the specific gravity from 1.5 to 0.1 by varying the composition of the slag and the intensity of the stirring and foaming operation.

If the raw material used contains substances which form poisonous or otherwise disagreeable gases, these will to a certain extent be present in the pores of my final product. Such gases are for example $H_2S$ an $PH_3$. These may however easily be eliminated by carrying out the foaming operation in an oxidizing atmosphere.

It is to be understood that the foregoing detailed description of my invention has been given for clearness of understanding only, and no undue limitation should be deduced therefrom, but the appended claims should be construed as broadly as permissible in view of the prior art.

What I claim as new and desire to secure by Letters Patent of the United States is:

1. In the manufacture of porous materials from melts by producing a foam therein the process which comprises passing said foam in proximity to a cooling body, thereby rapidly lowering the temperature of the whole mass, and cooling the foam further until solidification.

2. In the manufacture of porous materials from melts by producing a foam therein the process which comprises subjecting said foam to the action of a cooling roller, thereby rapidly lowering the temperature of the whole mass, and cooling the foam further until solidification.

3. In the manufacture of porous materials from melts by producing a foam therein the process which comprises subjecting said foam to the action of a water cooled roller, thereby rapidly lowering the temperature of the whole mass, and cooling the foam further until solidification.

4. In the manufacture of porous materials from melts by producing a foam therein the process which comprises subjecting said foam to the action of a water cooled roller, thereby rapidly lowering the temperature of the whole mass, directing a stream of water on the mass leaving the roller, and cooling the foam further until solidification.

5. In the manufacture of porous materials from melts by producing a foam therein the process which comprises subjecting said foam to the action of a water cooled roller capable of rapidly lowering the temperature of the whole mass, rolling the foam to form a sheet of approximately five millimeters thickness, and cooling the material so treated until solidification.

6. In the manufacture of porous materials from melts by producing a foam therein the process which comprises passing said foam in proximity to a cooling body, thereby rapidly lowering the temperature of the whole mass, running the cooled foam into a mould, and cooling further until solidification.

7. In the manufacture of porous materials from melts by producing a foam therein the process which comprises subjecting said foam to the action of a cooling roller, thereby rapidly lowering the temperature of the whole mass, running the cooled foam into a mould and cooling further until solidification.

8. In the manufacture of porous materials from melts by producing a foam therein the process which comprises subjecting said foam to the action of a water cooled roller, thereby rapidly lowering the temperature of the whole mass, running the cooled foam into a mould, and cooling further until solidification.

9. In the manufacture of porous materials from melts by producing a foam therein the process which comprises subjecting said foam to the action of a water cooled roller, thereby rapidly lowering the temperature of the whole mass, directing a stream of water on the mass leaving the roller, running the cooled foam into a mould and cooling further until solidification.

10. In the manufacture of porous materials from melts by producing a foam therein the process which comprises subjecting said foam to the action of a water cooled roller capable of lowering the temperature of the whole mass, rolling the foam to form a sheet of approximately five millimeters thickness, running the material so treated into a mould and cooling further until solidification.

11. In the manufacture of porous materials from melts by producing a foam therein the process which comprises subjecting such foam having a temperature of approximately 1000° C. to the action of a water cooled roller, thereby rapidly lowering the temperature of the foam to approximately 800° C., and cooling the foam further until solidification.

12. In the manufacture of porous materials from melts by producing a foam therein the process which comprises subjecting such foam having a temperature of approximately 1000° C. to the action of a water cooled roller, thereby rapidly lowering the temperature of the foam to approximately 800° C., running the foam into a mould and cooling further until solidification.

13. In the manufacture of porous materials from melts by producing a foam therein the process which comprises subjecting such foam having a temperature of approximately 1000° C. to the action of a water cooled roller capable of rapidly lowering the temperature of the foam to approximately 800° C., rolling the foam to form a sheet of approximately five millimeters thickness, and cooling the material so treated until solidification.

14. In the manufacture of porous materials from melts by producing a foam therein the process which comprises subjecting such foam having a temperature of 1000° C. to the action of a water cooled roller capable of rapidly lowering the temperature of the foam to 800° C., rolling the foam to form a sheet of five millimeters thickness, running the material so treated into a mould and cooling until solidification.

15. The process of effecting homogeneous porosity in material formed from molten slag or the like which comprises reducing the molten material to a foam of high fluidity, rapidly lowering the temperature of the foam by subjecting the same to the action of a cooling body, and solidifying the material so treated by slow cooling.

16. In the manufacture of porous blocks from molten slag or the like the process which comprises reducing the molten material to a foam, lowering the temperature of the foam and reducing it to sheet formation by subjecting the same to the action of cooling rollers, running the material so treated into molds and solidifying the same by slow cooling.

Signed at Christiania, Norway, this 20th day of April, 1920.

MATHIAS OVROM SEM.